April 7, 1970 H. G. SWANSON 3,504,876
MEANS FOR MOUNTING A PLURALITY OF INSTRUMENTS TO A PANEL
Filed April 1, 1968 3 Sheets-Sheet 1
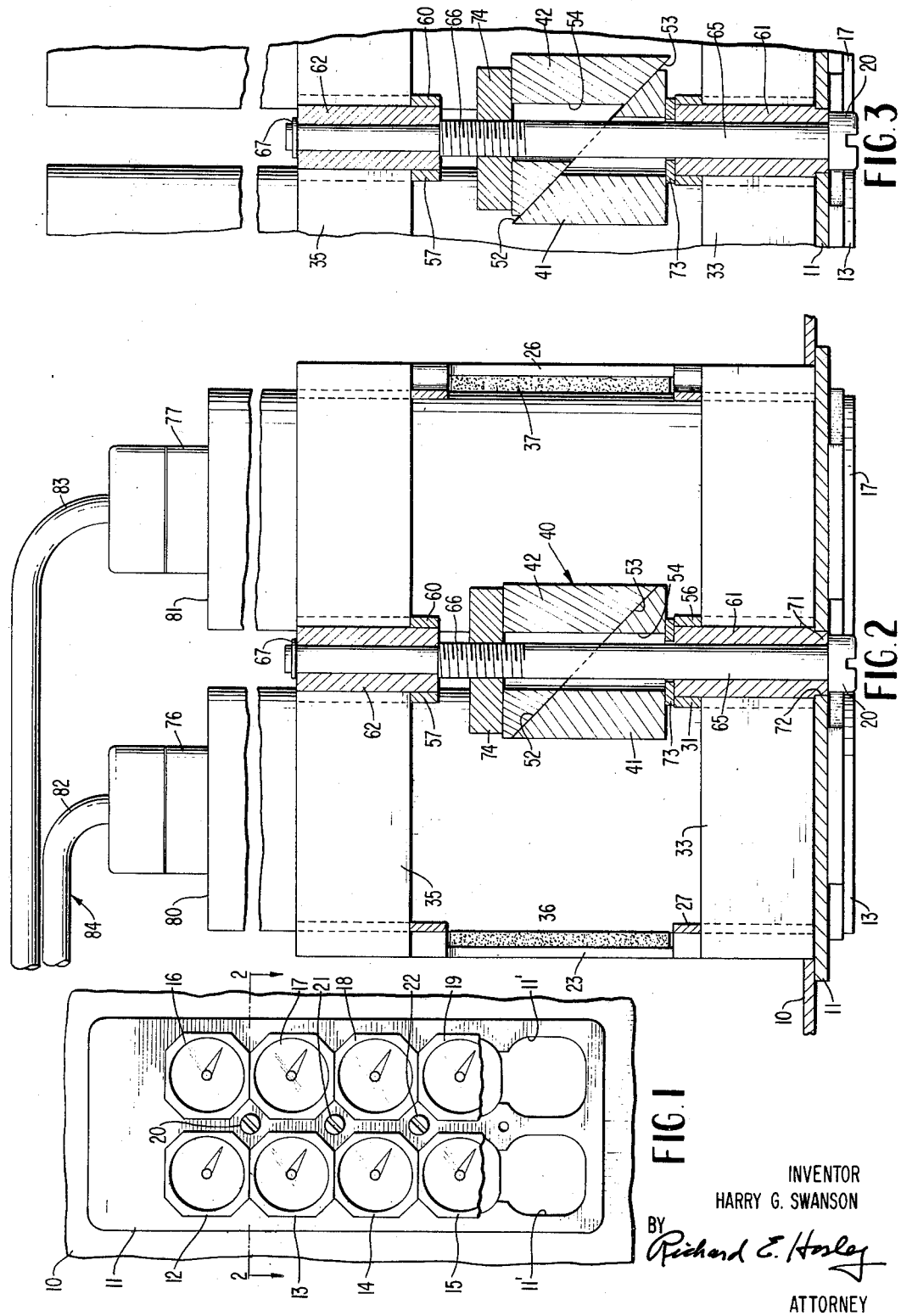
INVENTOR
HARRY G. SWANSON
BY Richard E. Horley
ATTORNEY April 7, 1970   H. G. SWANSON   3,504,876
MEANS FOR MOUNTING A PLURALITY OF INSTRUMENTS TO A PANEL
Filed April 1, 1968   3 Sheets-Sheet 2

United States Patent Office 3,504,876
Patented Apr. 7, 1970

3,504,876
MEANS FOR MOUNTING A PLURALITY OF INSTRUMENTS TO A PANEL
Harry G. Swanson, Tewksbury, Mass., assignor to General Electric Company, a corporation of New York
Filed Apr. 1, 1968, Ser. No. 717,607
Int. Cl. G12b 9/10; H02b 1/02
U.S. Cl. 248—27                                   10 Claims

ABSTRACT OF THE DISCLOSURE

An instrument panel assembly with means for mounting instruments including an expandable member adapted to engage the instruments housings pressing them against the inside surface of a surrounding supporting frame, said expandable member includes a bolt means which extends to the outside surface of the panel thereby permitting the actuation of the expandable member by an operator standing in front of the panel.

BACKGROUND OF THE INVENTION

This invention is directed to instrument panel mounting means and specifically to a means for mounting a plurality of instruments to a panel.

In certain instrument applications, especially aircraft installations, it is desirable to obtain a maximum instrument display in a minimum panel volume and panel display area. Coexistent with this display requirement is another requirement that effective instrument maintenance must be facilitated. In the prior art, strapping or clamping techniques have facilitated removal. However, with conventional mounting techniques the instruments have been spaced with a resultant loss in space utilization effectiveness.

Therefore, it is an object of this invention to provide an improved clamping device for mounting a plurality of instruments in a panel with a maximum space utilization.

Another object of this invention is to provide a clamping device for mounting a plurality of instruments in a panel especially adapted for aircraft installation.

Still another object of this invention is to provide a clamping device for an instrument panel which facilitates instrument maintenance.

SUMMARY

In accordance with one aspect of this invention, an expandable clamping member is captured by a panel supporting frame assembly and a plurality of clustered instruments. When the member is expanded by an operating means, the instruments are clamped between the frame assembly and the expandable member to be rigidly affixed in the panel assembly.

This invention is pointed out with particularity in the appended claims. An appreciation of the above and further objects and advantages of this invention may be had by referring to the following detailed description taken in conjunction with the accompanying drawings.

DESCRIPTION OF THE DRAWINGS

FIGURE 1 is a view of an instrument panel assembly which embodies this invention;

FIGURE 2 is a detailed view in cross section taken along lines 2—2 in FIGURE 1;

FIGURE 3 is another detailed view taken along lines 2—2 in FIGURE 1;

DESCRIPTION OF AN ILLUSTRATIVE EMBODIMENT

In the following discussion like numerals are used to designate like elements in all figures.

The general appearance of an instrument display provided on an instrument panel assembly formed in accordance with this invention and installed in a supporting panel is presented in FIGURE 1. A supporting panel 10 has an aperture formed therethrough to accommodate an instrument panel assembly so that a front panel 11 covers the opening. For purposes of explanation, eight instruments, 12 through 19, are mounted in apertures 11' in the front panel so that their dial faces are visible from the front panel 11. Three boltheads, 20 through 22, located between adjacent of the clustered instruments 12 through 19, serve as accessible operating members to cause engagement and disengagement of mounting means for the instruments 12 through 19 in the panel assembly to facilitate instrument removal and replacement. The details of an instrument mounting means constructed in accordance with this invention can best be realized by referring to FIGURES 2 through 6.

Figure 6:
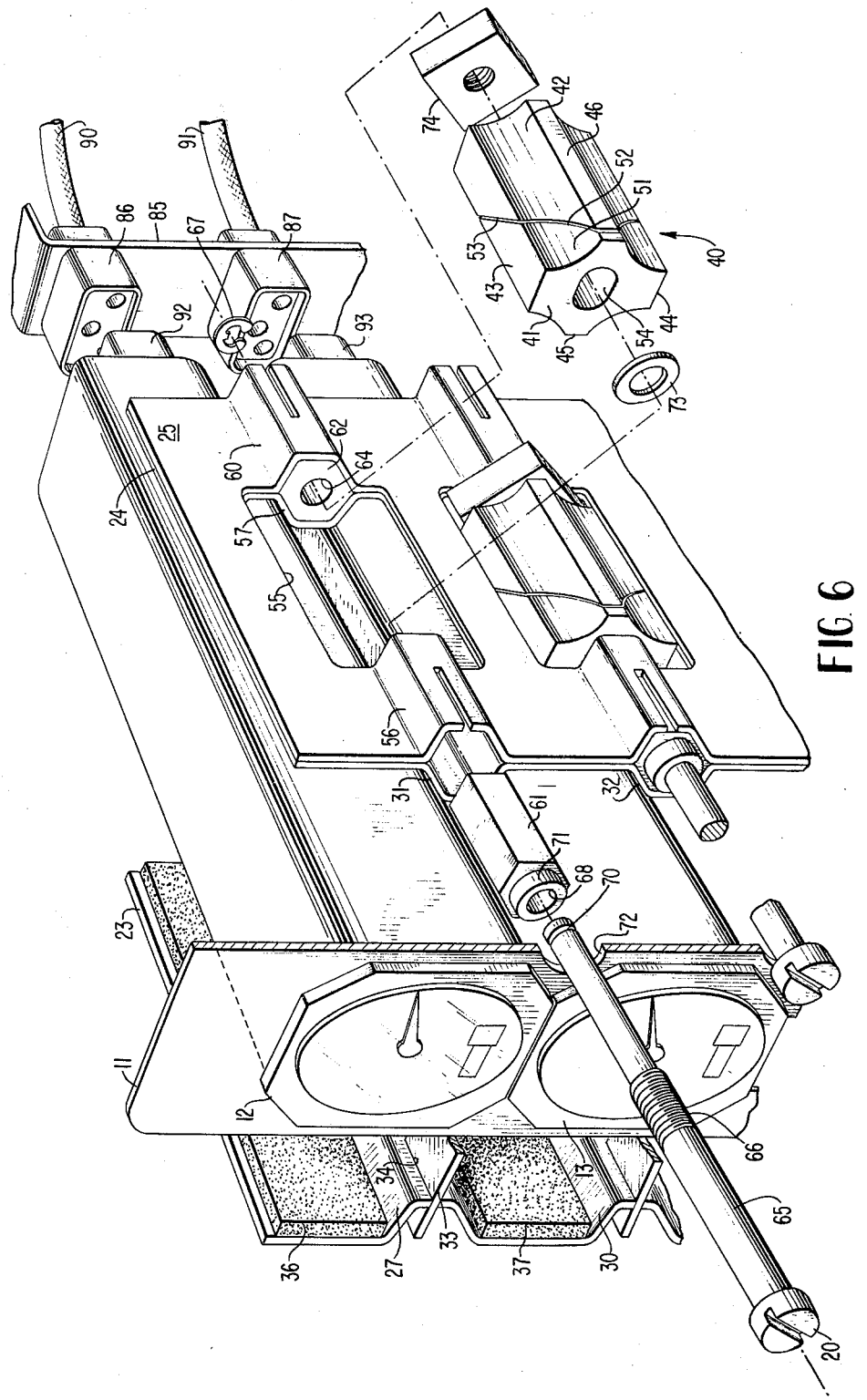
FIGURE 6 is a partially exploded view of an instrument panel assembly incorporating this invention.

As specifically shown in FIGURES 2 and 6 a plurality of rearwardly extending frame members 23, 24, 25 and 26 are welded or otherwise affixed to the front panel 11. Each frame member is identically formed as a planar member with a plurality of spaced offsets located between the instruments. For example, forward offsets 27 and 30 are formed in the frame member 23 while similar offsets 31 and 32 are formed in the frame member 24. To complete a supporting frame assembly, a plurality of cross strips are mounted in slots formed in the offsets to span the frame members. For example, a metal strip 33 spans the offsets 27 and 31. In this specific example, it is initially located in a slot, such as the slot 34 in the offset 27, and then permanently affixed to the frame members. Similar offsets and metal strips are used at the rear of the frame members. For example, a metal strip 35 is connected to the frame members 23 and 24. In addition to rigidifying the supporting frame assembly, the metal strips also temporarily support the instruments.

The panel members and the metal strips define a plurality of instrument compartments. The outer sidewalls of the compartments are formed by the frame members 23 and 26. In the structure shown in FIGURES 5 and 6, resilient pads 36 and 37 are mounted to the frame member 23 to serve as an instrument cushioning support. One such resilient means is located in each outer compartment on the outer walls thereof. If the panel assembly included three or more vertical rows, only the outer compartments would be padded.

An expandable clamping member formed in accordance with this invention is located between adjacent of closely clustered instruments to serve as a clamping member. For example, an expandable clamping member 40, controlled by turning the bolthead 20 and located between instruments 12, 13, 16 and 17, is shown in detail in the drawings, specifically FIGURE 6.

As each expandable clamping member is identical, only the expandable clamping member 40 between the instruments 12, 13, 16 and 17 is discussed in detail. Two separate units 41 and 42 have two pairs of opposing flat surfaces 43 and 44 and 45 and 46. Surfaces between the adjacent flat portions are coextensive with portions of the instruments to provide maximum safe clamping forces. For example, the instrument 16 has a generally rectangular cross section with a radiused corner 50.

Coextensive surfaces 51 are formed on the expandable member 40. The two units 41 and 42 are adapted to slide along planar surfaces 52 and 53. The plane defined thereby is oblique to a longitudinal axis through the expandable clamping member 40. An elongated bore 54 is also on the axis to permit relative movement of the units 41 and 42 without blocking the bore 54.

This expandable member is located in an aperture 55 formed in the frame members 24 and 25 between the offset portions. In FIGURES 2, 3, 5 and 6, an offset on the rearwardly extending panel 25 is designated by numeral 56 while rear offsets are designated by numerals 57 and 60. Inserts 61 and 62 are formed to lie in channels formed by the opposed offsets 31 and 56 and 57 and 60. Each insert is bored to provide axially aligned apertures 63 and 64 in the inserts 61 and 62, respectively. The apertures 63 and 64 and the aperture 55 are oriented so an axis therethrough is coincidental with the elongated bore axis. With this configuration, the inserts 61 and 62 serve as a retaining means for a bolt 65 which includes a threaded portion 66 and means for axially capturing the bolt 65, shown as a C ring 67 and annular groove 70. The inserts 61 and 62 are permanently affixed in the offset channels by any conventional means. The insert 61 additionally has a bushing portion 71 adapted to be centered in a panel aperture 72.

When the system is assembled, the expandable clamping member 40 is located in the aperture 55 between the offset portions. A washer 73 bears against the front insert 61 while a nut 74 is located between the expandable clamping member 40 and the rear insert 62. The axially captured bolt 65 passes through the front insert 61, the washer 73, the expandable clamping member 40 and the rear insert 62 but is threaded in the nut 74.

Rotation of the bolt 65 by engaging the bolthead 20 by some suitable means, such as a screwdriver, causes axial displacement of the nut 74 which is captured between the adjacent instruments. This is specifically shown in FIGURE 5 which illustrates the position of a nut 75 located adjacent the cluster of instruments 13, 14, 17 and 18.

Figure 5:
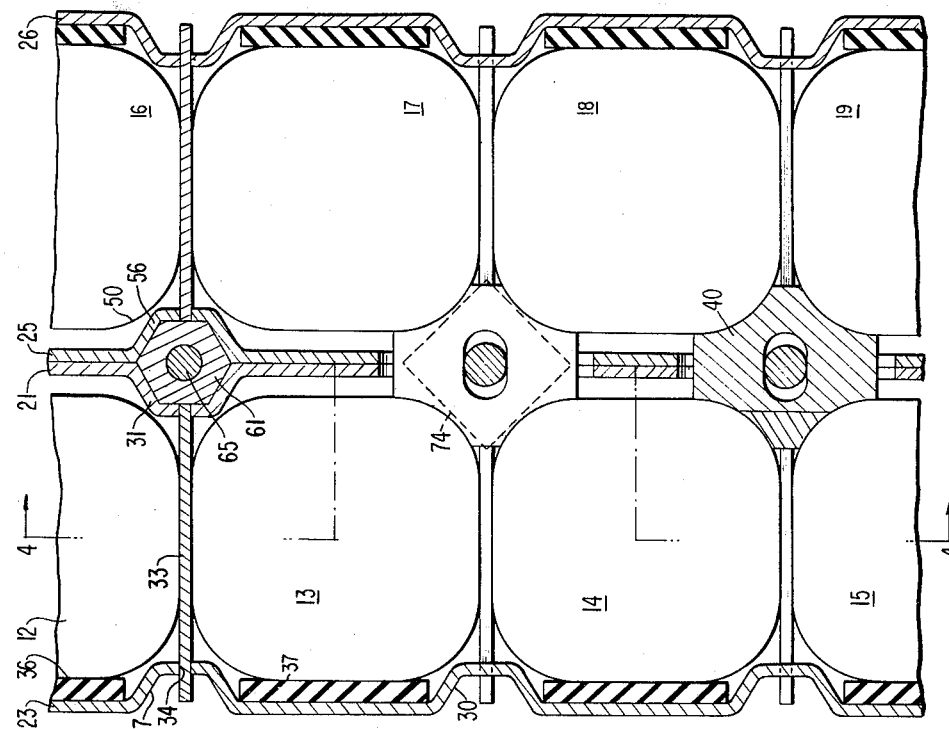
FIGURE 5 is a cross-sectional view taken along lines 5—5 in FIGURE 4 to illustrate the clamping action of the invention.
Figure 4:
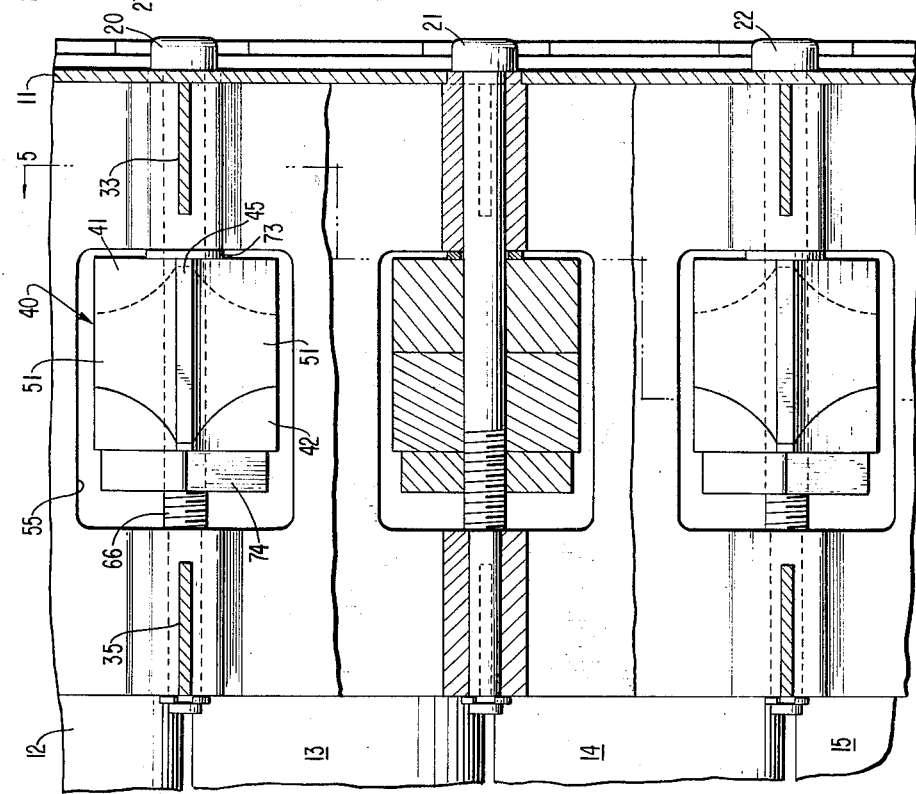
FIGURE 4 is a cross-sectional view taken along lines 4—4 in FIGURE 5 to show the construction of an expandable member.

Referring to FIGURE 2, when the bolthead 20 is turned, the nut 74 advances and engages the rearwardly located unit 42 of the expandable clamping member 40. Further rotation of the bolt 65 causes the unit 42 to slide along the plane of the surfaces 52 and 53 and thereby increase its dimension in a direction transverse to the axis of the bolt 65 as shown in FIGURE 3. The coextensive portions 51 on the expandable clamping member 40 engage the instrument cases and force the instruments into the resilient pads such as the pads 36 and 37 as shown in FIGURES 5 and 6. Therefore, when the bolt 65 is rotated to a predetermined position, all the instruments in the panel are firmly clamped in the supporting frame assembly.

This assembly is adapted to a number of instrument panel configurations. For example, in FIGURE 2 the instruments 13 and 17 have conventional cable connectors 76 and 77 respectively disposed on rear endwalls 80 and 81. These cable connectors are adapted to be coupled to individual cables 82 and 83 which form a part of a wiring harness 84. With this approach, the entire panel with all the instruments may be removed. After the cables are disconnected, rotation of appropriate bolts permits removal of the desired instruments.

Another mounting configuration is shown in FIGURE 6 wherein an alternative mounting connection is associated with the instruments 12 and 13. Mounted to the rear of either the supporting frame or panel assemblies is a strap 85 which includes stab mounting terminations 86 and 87 for cables 90 and 91. By using stab connectors 92 and 93 on the rear end walls of the instruments, an individual instrument, such as the instrument 12, may be independently removed from or inserted into the panel assembly after loosening or tightening the bolt. Reinforcing metal strips such as 34 and 35 at the front and rear portions of the instrument compartment additionally serve as temporary instrument supports when the bolts are loosened.

In accordance with this invention an instrument panel assembly is provided which is specifically adapted to actively utilize display area. It has been found that at least a twenty percent increase in instrument display area can be attained without any increase in panel area when the mounting arrangement forming this invention is utilized. Instrument maintenance is also facilitated because individual instrument removal can be accomplished without removing the entire panel from the aircraft.

It will be obvious to those of ordinary skill in the art that many modifications may be made to such an instrument mounting assembly. Modifications of the expandable clamping member may be accomplished to accommodate either peculiar or conventional instrument design. Coextensive or non-coextensive surfaces may be formed on the expandable member depending on the relative strength of the associated instrument cases. Different means may be used to actuate the expandable clamping members. Furthermore, it will be obvious that other panel configurations including more than two vertical rows are adapted to use this invention.

What is claimed as new and desired to be secured by Letters Patent of the United States is:

1. A mounting means for mounting a plurality of closely juxtaposed instruments in an instrument panel by simultaneously exerting lateral force on a plurality of said closely juxtaposed instruments having a supporting frame assembly comprising:

(a) An expandable clamping member adapted to be captured by the supporting frame assembly and expandable into the plurality of juxtaposed instruments adjacent thereto, said expandable clamping member comprising two coaxial members having mating surfaces in slidable engagement and, (b) Operating means operably connected to said clamping member and adapted to be mounted to said supporting frame assembly and for actuating said coaxial members relative to each other to provide movement between said mating surfaces to thereby move said clamping member into engagement with the adjacent instruments and thereby clamp the instruments against the supporting frame assembly.

2. An instrument panel assembly as recited in claim 1 wherein said clamping member has portions thereof configured to be coextensive with portions of the instruments engaged thereby.

3. An instrument panel assembly as recited in claim 1 wherein said operating means produce a force along an axis and said clamping member includes first and second units contiguous at and slidable along a plane oblique to the force axis.

4. An instrument panel assembly as recited in claim 3 wherein said first and second units have surfaces formed to be coextensive with portions of the instruments engaged thereby, said first unit being adapted to engage certain of the adjacent instruments and said second unit being adapted to engage the others of the adjacent instruments.

5. An instrument panel assembly comprising:

(a) a panel having a plurality of apertures formed therethrough, (b) a supporting frame assembly extending rearwardly from said panel to form open instrument compartments behind certain of the panel apertures, (c) a plurality of instruments, each instrument being mounted through a panel aperture with a portion disposed in one of said frame assembly compartments, said instruments being located in close juxtaposition to each other in said frame assembly, (d) an expandable clamping member loosely captured by said frame assembly having engaging portions adapted to be coextensive with portions of adjacent of said instruments, and (e) an operating assembly for each expandable clamping member mounted to said frame assembly, accessible from said panel through others of the apertures and operably connected to said expandable member for forcing said expandable member engaging portions into contact with said instruments to thereby force said instruments against said frame assembly whereby said instruments are clamped between said expandable member and said frame assembly.

6. An instrument panel as recited in claim 5 wherein said supporting frame assembly comprises a plurality of parallel, rearwardly extending, substantially planar frame members, certain of said frame members having an aperture located between adjacent pairs of said instruments and formed therethrough to capture said expandable member.

7. An instrument panel as recited in claim 6 wherein said others of said planar frame members have means disposed thereon adapted to provide a resilient seat for said instruments when they are forced against said supporting frame assembly.

8. An instrument panel as recited in claim 6 wherein said operable member produces a force along an axis and said expandable member includes first and second units slideably contiguous along a plane oblique to the force axis, said operable member engaging one of said units.

9. An instrument panel as recited in claim 8 wherein said central planar member has channel portions extending along the axis from the aperture, said operable member comprising a nut and bolt assembly, said bolt being axially captured and accessible from the front of said panel and said nut being captured by adjacent instruments to allow axial displacement of said nut into one unit of said expandable member.

10. An instrument panel as recited in claim 9 wherein said expandable clamping member has an axially extending, elongated aperture formed therethrough to permit relative movement of said first and second units transverse to the force axis.

References Cited

UNITED STATES PATENTS

| | | | |
|---|---|---|---|
| 1,424,611 | 8/1922 | Barbarou | 248—27 |
| 2,641,038 | 6/1953 | Christophersen | 248—27 X |

ROY D. FRAZIER, Primary Examiner

J. FRANKLIN FOSS, Assistant Examiner

U.S. Cl. X.R.

312—333; 339—126